(12) United States Patent
Stopperan

(10) Patent No.: US 11,648,766 B1
(45) Date of Patent: *May 16, 2023

(54) PROCESS FOR MAKING A FLEXIBLE FOIL HEATER

(71) Applicant: Jahn Jeffery Stopperan, Lakeville, MN (US)

(72) Inventor: Jahn Jeffery Stopperan, Lakeville, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/191,174

(22) Filed: Mar. 3, 2021

(51) Int. Cl.
| | |
|---|---|
| B32B 38/00 | (2006.01) |
| B32B 7/12 | (2006.01) |
| B32B 15/08 | (2006.01) |
| B32B 43/00 | (2006.01) |
| B32B 38/04 | (2006.01) |
| B32B 38/18 | (2006.01) |
| H05B 3/36 | (2006.01) |
| B32B 37/12 | (2006.01) |
| B23K 26/38 | (2014.01) |

(52) U.S. Cl.
CPC ............ *B32B 38/0004* (2013.01); *B32B 7/12* (2013.01); *B32B 15/08* (2013.01); *B32B 37/12* (2013.01); *H05B 3/36* (2013.01); *B23K 26/38* (2013.01); *B29C 2793/0018* (2013.01); *B29C 2793/0045* (2013.01); *B32B 38/04* (2013.01); *B32B 38/185* (2013.01); *B32B 43/003* (2013.01); *B32B 2038/047* (2013.01); *B32B 2307/202* (2013.01); *B32B 2310/0843* (2013.01); *B32B 2457/00* (2013.01); *H05B 2203/016* (2013.01); *H05B 2203/017* (2013.01); *Y10T 156/1056* (2015.01); *Y10T 156/1057* (2015.01); *Y10T 156/1062* (2015.01)

(58) Field of Classification Search
None
See application file for complete search history.

(56) References Cited

U.S. PATENT DOCUMENTS

| | | | |
|---|---|---|---|
| 2,600,486 A | 6/1952 | Cox | |
| 3,263,307 A | 8/1966 | Lund et al. | |
| 3,516,154 A * | 6/1970 | Wainwright | H05B 3/267 29/847 |
| 3,555,950 A | 1/1971 | Gerardus et al. | |
| 3,745,649 A * | 7/1973 | Doi | H05B 3/36 156/244.18 |
| 4,454,886 A | 6/1984 | Lee | |
| 4,889,973 A | 12/1989 | Farinacci et al. | |
| 6,884,965 B2 | 4/2005 | Nelson et al. | |
| 2005/0100719 A1* | 5/2005 | Kanakarajan | B32B 7/027 428/209 |
| 2006/0289110 A1 | 12/2006 | Schmitt et al. | |

(Continued)

FOREIGN PATENT DOCUMENTS

| | | | |
|---|---|---|---|
| JP | 19880321796 A1 | 6/1990 | |
| JP | 407037681 A * | 2/1995 | ............. Y02B 30/00 |

(Continued)

*Primary Examiner* — Linda L Gray
(74) *Attorney, Agent, or Firm* — Berggren Law Offices, LLC

(57) ABSTRACT

A method of making a metal foil heater comprising transferring a line image of a heater circuit to cutter and cutting the foil into a metal foil construction before affixing plastic sheets to both sides while attaching wires configured to supply current to the heater.

21 Claims, 6 Drawing Sheets

(56) References Cited

U.S. PATENT DOCUMENTS

| | | |
|---|---|---|
| 2006/0289472 A1 | 12/2006 | Beisser et al. |
| 2016/0007474 A1 | 1/2016 | Dardona et al. |
| 2018/0093455 A1 | 4/2018 | Zou |
| 2019/0373680 A1 | 12/2019 | Barfuss et al. |
| 2020/0115059 A1* | 4/2020 | George .................. H05B 3/145 |

FOREIGN PATENT DOCUMENTS

| | | |
|---|---|---|
| JP | 19970180463 A1 | 1/1999 |
| YU | 2003P000051 A1 | 8/2006 |

* cited by examiner

PROCESS FOR MAKING A FLEXIBLE FOIL HEATER

FIELD OF THE INVENTION

This invention relates to a process for making a flexible metal foil heater, particularly a non-etched metal foil heater.

BACKGROUND OF THE INVENTION

Flexible metal foil heaters are thin constructions that comprise a resistive foil image between two dielectric films adhered together with thermal adhesives. These heaters are typically known as etched foil heaters because the resistive foil is etched into a pattern to provide a desired heating profile formed into a pattern to provide a desired heat profile more precise than heaters with resistive components made of wire.

Etched foil heaters are a product of Ohm's law, meaning that wattage (power emitted as heat) is created when voltage (volts), resistance (ohms), and current (amperes) are intermixed using an electrical conducting medium. When any of these three variables are altered, the resulting wattage is changed. The phenomenon is true with any type of conductive materials including wire, foil, polymers, and resistive metals.

With etched foil heaters, the conductive medium is a resistive metal foil that has a thickness that is typically between 1 and 3 thousandths of an inch (also referred to a 1 to 3 mils or 0.001 to 0.003 inches.

This foil is patterned in such a way that it provides a path for the electricity to extend throughout the physical area of the heater. The general result is the power induced into the pattern is equally disbursed, therefore the thermal output is also uniformly disbursed. However, physical aspects of the heater on a mounting surface usually create non-uniform thermal results such as heat loss at edges, thermal variances near holes, or heat retention occurring from unique physical characteristics in the heat sink.

Another factor contributing to varying thermal results is if the foil pattern is not uniform, producing areas with gaps where conductors are not consistent, creating cooler or warmer areas. Yet etched foils are ideal for creating very uniform or customized thermal results because the conductor layout can be extremely precise in location, repeatability, and spacing.

Thermal dissipation is an advantage. A favorable characteristic of flexible etched foil heaters is the materials that comprise the heater have excellent thermally conductive properties and are extremely thin, typically between 2 and 4 mils. This enables the heat generated from the embedded conductor to transfer away from the conductor quickly and into the mounting surface.

This feature becomes valuable in applications where quick or highly responsive thermal adjustments are desired. This also enables flexible heaters to deliver higher-than-expected wattages in a thin package. Even higher thermal output levels can be obtained if the heater is compressed between two heat sinks to extract the heat away from the foil quickly preventing the high heat from weakening or degrading the internal bonding adhesive of the heater itself.

Precise patterns contribute to control of heating profiles. Etched foil heaters provide the opportunity for unlimited patterning of the thermal conductors, yet unlike wire-based flexible heaters, each heater produced in a production mode will be identical. The precision of the pattern can be ultra-fine with spacings of 3 mils wide or the pattern can have varying space distances or varying conductor widths. When coupled with the ability of the overall pattern to be variable as well, etched foil heaters can be tuned in multiple ways to produce the desired thermal output. In addition, the heaters can have two-in-one heaters interwoven within one pattern. The precision of etched foil heaters also permits the modification of the layout to provide multiple zones or to modify the heat produced based upon the thermal losses in and around the heater.

However, the process steps of etching the foil into a pattern is expensive, time-consuming, and limiting. The etching step involves four basic steps. The first step is creating a base laminate by laminating a preselected type and thickness of resistive foil to the base dielectric film using a thermoset adhesive under a varied profile of high temperature and pressure. The second step is imaging a pattern on the resistive foil by applying a photo-sensitive etch resist film onto the foil followed by selectively exposing the film with an artwork or by utilizing a laser followed by removing the unexposed photo resist from the laminate. The third step is curing the exposed photo-sensitive resist producing a hardened, chemically resistive pattern on the foil base laminate that protects the conductor foil beneath during chemical etching. The fourth step is etching the undesired conductor regions from the foil laminate by submerging the laminate in etching chemicals to remove the foil spacings between the conductive pattern, leaving only the continuous heating element. After etching, the hardened resist that remains over the protected resistive pattern is chemically stripped.

This series of steps using photo-sensitive imaging and photo-etching processes to produce a heating element are time consuming and expensive. In addition, the etching chemicals exposed to the components of the base laminate limit the type of dielectric materials and bonding adhesives that may be used to make flexible foil heaters.

In 2017, I invented a flexible foil heater that had similar thermal dissipation results as the etched foil heaters but did not use etching to create the imaged foil conductor element of the heater and did not use the known expensive and time-consuming process of etched foil heaters. The process used thermoset and thermoplastic adhesives. The process of how to create the metal foil heating circuit image without etching was kept trade secret until now.

There is a need for a method of making flexible foil heaters that uses a method of making the imaged foil without using expensive and corrosive etching chemicals and time-consuming etching processes to create the pattern foil conductors of the flexible foil heaters.

SUMMARY OF THE INVENTION

The invention comprises such a method that permits a wider variety of types of bonding adhesives and dielectric films to meet a wider variety of needs in the marketplace.

The method of making a foil heater for prolonged use at a use temperature comprises eight steps. One step is providing a metal foil sheet construction that comprises a first metal side, a second side, and metal foil that is electrically conductive and has a thickness. Another step is providing a first plastic coated adhesive sheet with a first adhesive layer having an adhesive surface on a first side and a first plastic layer having a plastic surface on a second side and a second plastic coated adhesive sheet with a second adhesive layer having an adhesive surface on a first side and a plastic layer having a plastic surface on a second side. Another step is providing a cutting platform having a satisfactorily releasably adherable surface configured (1) to hold the metal foil sheet construction in place while it is being cut into a foil heating circuit image and a background image and (2) to release the background image when the background image is removed from the releasably adherable surface. Still another step is placing the metal foil sheet construction on top of the releasably adhering surface of the cutting platform with the first metal side contacting the releasably adhering surface of the cutting platform with a first adhesion force and the second side facing outward from the releasably adherable surface. Another step is communicating a line drawing of a graphic image of a foil heating circuit and a background image to a cutter apparatus with at least one cutting instrument. Still another step is interacting the cutting platform and the metal foil sheet construction with the cutter apparatus configured to use at least one cutting instrument to trace along the line drawing of the graphic image and completely thorough the metal foil sheet construction to create a metal foil image sheet of a metal foil heating circuit having a first metal side and a second side and a background image sheet of spaces. Another step is making at least two openings through the second plastic coated adhesive sheet to expose at least two terminals of the metal side of the metal foil sheet construction in the shape of the metal foil heating circuit on the first plastic coated adhesive sheet through the second plastic coated adhesive sheet. Another step is placing the first adhesive layer of the first plastic coated adhesive sheet in adherable contact with the second side of the metal foil image sheet and placing the second adhesive layer of the second plastic coated adhesive sheet in adherable contact with the metal foil side of the metal foil image sheet wherein the metal foil at the terminals is exposed to form a metal foil heater. Wherein all plastics and adhesives in the metal foil heater have a softening point and a melting point above the temperature of use for the foil heater.

This method enables the use of adhesives in the first and second adhesive layers that do not have to be undegradable when exposed to etching chemicals. Thermoset, thermoplastic, and pressure sensitive adhesives may be considered if they maintain satisfactory bonding to the dielectric films and metal foil sheet constructions of the flexible foil heaters made with the method of the invention.

The previously mentioned features and advantages will become apparent from the following detailed description of illustrative embodiments thereof, which is to be read in connection with the accompanying drawings.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

Figure 1:
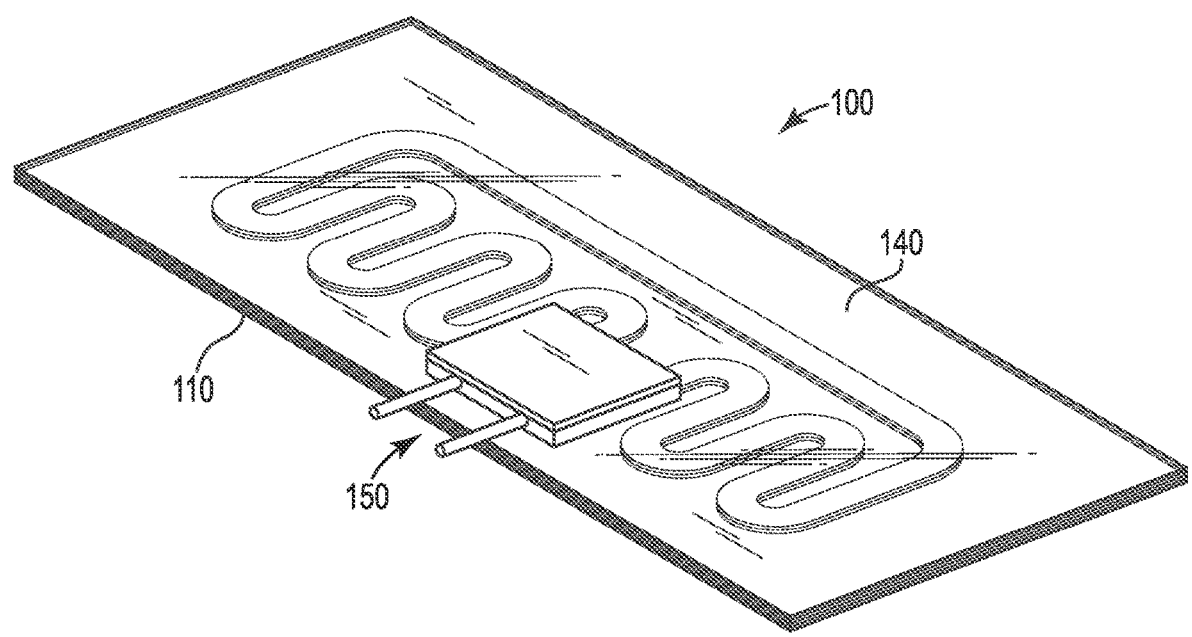
FIG. 1 is a perspective view of an embodiment of a flexible foil heater made by the method of the invention.

While the invention is amenable to various modifications and alternative forms, specifics thereof have been shown by way of example in the drawings and will be described in detail below. It is to be understood, however, that the intention is not to limit the invention to the embodiments described. On the contrary, the invention is intended to cover all modifications, equivalents, and alternatives falling within the scope of the invention as defined by the appended claims.

DETAILED DESCRIPTION OF SOME EMBODIMENTS OF THE INVENTION

Flexible foil heaters are commonly specified by the wattage they deliver. However, customers are ultimately seeking to achieve a thermal result of their system. Therefore, it is important for users of flexible foil heaters to understand several key elements to define the wattage required. First, the minimum temperature value of the system before any heat is applied—minimum ambient temperature. Second, the desired maximum of the system after heating is applied. Third, the speed that the temperature of the system needs to transition from the minimum ambient temperature to the desired maximum temperature—temperature rise slope.

Flexible foil heaters are defined by the wattage they deliver. It is common for the wattage to be noted in the printed specifications for a heater. But users of flexible foil heaters should understand that maintaining and controlling the thermal results are better managed using the unit of measure identified as watt density. Watt density is the overall wattage of a heater divided by the area of the heater. For instance, a 100 watt (W) heater that is 4 inches by 4 inches (4 in. by 4 in.) equates to a Watt Density of 6.25 $W \cdot in^2$. Utilizing watt density can be illustrated in the following example. A design may have two sizes of product where the heated surfaces on each of them are to be identical. For the designer to specify the two heaters, the designer would use Watt Density to achieve identical results.

Thermal limits are not defined by a maximum watt density rating. Instead, the thermal limit is defined by the actual temperature that the individual layers of the flexible foil heater reach in the specific application. Flexible foil heaters can deliver hundreds of watts per square inch, provided the heat generated is dissipated quickly away from the flexible foil heater. Quick dissipation of heat ensures the heater itself never exceeds the mechanical limits of holding itself together or delaminating. It is imperative the foil conductor is not powered high or so quickly that the heat of the conductor cannot be dissipated away, causing a delamination of the layers or potentially even burn-out of the foil itself by creating an open conductive path.

For example, the bonding agents of a silicone rubber flexible foil heater will start to degrade at 230° C. Yet a silicone rubber flexible foil heater can be utilized to deliver 250° C. worth of temperature rise, provided the starting temperature of the flexible foil heater is −40° C. Another example is a flexible foil heater that is mechanically compressed between two heat sinks and must deliver unusually high wattage to raise the temperature of the heat sinks in a fast time frame. If the flexible foil heater were to be suspended in air, the flexible foil heater would overheat. But since the heat is dissipated into the heat sinks, the layers of the flexible foil heater itself do not reach the bonding limit or the conductor burn-out temperature.

Flexible foil heaters made by the inventive method typically achieve the performance properties of the etched foil heaters. Also, the method permits use of a wider variety of materials including, at lower costs, and with faster manufacturing times. Bonding materials such as thermoplastic and pressure sensitive adhesives together with a wider variety of dielectric films may now be used since there is no restrictions to be stable under exposure to harsh etching chemicals. Specifically, the method of making a foil heater for prolonged use at a use temperature comprises eight steps.

One step is providing a metal foil sheet construction that comprises a first metal side, a second side, and metal foil that is electrically conductive and has a thickness. The metal foil is a resistive conductor that converts electricity into heat in a metal foil heater. It is made by pressing metal into the suitable thickness and not by coating metal onto a support surface. Thin metal foils often bend under their own weight and can be torn easily while handling. Thicker metal foils are less ductile and more self-supporting and more tear resistant.

The metal foil construction has a thickness and a shape configured to be a resistive conductive circuit with at least one pair of terminals, a first side that is metal, a second side, and a metal foil with a thickness. The metal foil is a resistive conductor that converts electricity into heat in a metal foil heater. It is made by pressing metal into the suitable thickness and not by coating metal onto a support surface.

Metal foil sheets used in flexible metal foil heaters are flexible because of their thin nature. In addition, the metals used are often annealed in such a way to result in structural strength of the foil to resist fracturing in bending actions. This means that they enable the metal foil heater to be bent around a 0.050-inch diameter mandrel without inducing permanent deformation of the metal foil conductor.

Metal foils used in flexible metal foil heaters may have a thickness of under 0.3 mils to over 5 mils to be considered suitable in a flexible metal foil heater. Metal foils on the thinner side, typically under 3 mils depending on the metal used, have a difficulty lying flat without wrinkling, and a tendency to undesirably tear when removed from a releasable adhering surface due to the thinness and ductile properties of the metal foil, and the lifting forces exerted during peeling. Thicker foils, typically over 3 mils, can be handled without undesirable tearing but remain flexible. Metal foil used in flexible foil heaters is from a group consisting of nickel, copper, nickel-copper, Inconel, Constantan, aluminum, stainless steel, and other resistive foils commonly used for resistive heaters.

In some embodiments the metal foil construction comprises a metal foil that is thin and prone to tearing and wrinkling and a plastic support layer to minimize tearing and wrinkling of the metal foil during handling and cutting. The plastic support layer comprises a plastic that, when adhered to the metal foil, results in a metal foil construction that is easy to lay flat and resistant to tearing when peeled off a releasably adhering surface. In these embodiments, plastic support layer has a thickness of between 0.5 mil and 5 mils and comprises a flexible dielectric material from a group consisting of polyester, poly propylene, high density polyethylene, low density polyethylene, polyimide, polytetrafluoroethylene, polyvinyl chloride, nylon, and glass epoxy blends.

Thinner metal foils are adhered to plastic support layers to permit handling without undesirable tearing or wrinkling. The plastic support layers may be bought commercially as adherable plastic layers made with pressure-sensitive adhesives, thermoplastic adhesives, or thermoset adhesives on plastic layer. They may also be made before assembly of the flexible metal foil heaters by applying any adhesive including, for example, pressure-sensitive adhesives, thermoplastic adhesives, or thermoset adhesives on a plastic layer before assembly of the flexible metal foil heater. Alternatively, the plastic may be coated onto one side of the thin metal foil and hardened by such means as, for example, drying or curing.

In some embodiments, the metal foil construction comprises a metal foil layer and a plastic support layer without an adhering layer. The metal foil layer has the first side and a second side and a thickness of between 0.3 mils and 3 mils. The plastic support layer is coated onto the second side of the metal foil layer and attaches to it through the hardening process, by, for example, drying or curing. In these embodiments, plastic support layer has a thickness of between 0.5 mil and 5 mils and comprises a flexible dielectric material that, for example, may come from a group consisting of polyester, poly propylene, high density polyethylene, low density polyethylene, polyimide, polytetrafluoroethylene, polyvinyl chloride, nylon, and glass epoxy blends.

Metal foil constructions of this embodiment may be obtained from commercial sources with specified materials and thicknesses or may be assembled prior to the formation of a flexible metal foil heater. The adhering layer and the plastic support layer together have a thickness of between 0.3 mils and 7 mils and add to the dielectric layer of the first adhesive coated sheet of the flexible metal foil heater and contribute to the heating profile of a specific heater.

In some embodiments, the metal construction comprises only one layer of metal foil. In this embodiment, the second side of the metal foil construction is metal, and the metal foil construction is configured to be laid flat without wrinkling, to be resistive to tearing when cut or removed from a releasably adhering surface, and to be flexible. As mentioned above, this layer often has a thickness of greater than 3 mils.

Another step is providing a first plastic-coated adhesive sheet with a first adhesive layer having an adhesive surface on a first side and a first plastic layer having a plastic surface on a second side and a second plastic coated adhesive sheet with a second adhesive layer having an adhesive surface on a first side and a plastic layer having a plastic surface on a second side. As discussed above, the plastic film is a dielectric layer that passes the heat to a surface that the foil heater is configured to heat. The adhesive layer in both sheets is both a dielectric and a bonding means between the first and second plastic layers and the metal foil sandwiched construction between. It is important that the adhesive be to not degrade under prolonged temperature exposure in a metal foil heater that would result in delamination of the plastic films from each other or from the metal foil construction.

Typically, the plastic layer in each of the plastic-coated adhesive sheets has a thickness ranging between 0.5 mil and 3 mils and is a flexible dielectric material that, for example, may come from a group consisting of polyester, poly propylene, high density polyethylene, low density polyethylene, polyimide, polytetrafluoroethylene, polyvinyl chloride, nylon, and glass epoxy blends. The first plastic layer and a second plastic layer may be the same or different in either type, thickness, or both depending on the specific heating requirements of the flexible metal foil heater.

The adhesive layer in each of the plastic-coated adhesive sheets may comprise a pressure-sensitive adhesive, a thermoplastic or hot-melt adhesive, or a thermoset adhesive. Typically, the adhesive layer of each sheet has a thickness of between 0.5 mil and 3 mils. The first adhesive layer and the second adhesive layer may be the same or different in either type, thickness, or both depending on the specific heating requirements of the flexible metal foil heater.

In some embodiments, the adhesive layer used is a pressure sensitive adhesive and adhering the first plastic coated adhesive sheet and the second plastic coated adhesive sheet to each other and to a metal foil construction in the shape of the metal foil heating circuit is done by applying pressure at room temperature of 30° C. The pressure-sensitive adhesive on the two plastic films coated with adhesive is from a group consisting of acrylic, silicone, rubber, silicone-rubber, and modified epoxy.

In some embodiments, the adhesive used on the two plastic films coated with adhesive is a thermoplastic adhesive that is solid at 100% solid at 30° C., melts to the partially liquid phase in temperature ranges of 80 to 200° C., and solidifies to form bonding when it is cooled to use temperature. The thermoplastic adhesive on the two plastic films coated with adhesive is from a group consisting of polyolefin, polyamide, polyester, polyurethane, and styrene-butadiene copolymers.

The adhering of the two thermoplastic adhesive layers to relevant surfaces in the metal foil heater occurs in two steps. The first plastic film coated with thermoplastic adhesive is laid on the cutting platform with the second side of the metal foil construction touching the adhesive surface of the plastic-coated adhesive sheet. Pressure and temperature are applied to soften the adhesive. It cools and bonds to the second side of the metal foil construction with a higher adhesion force than the bond of the first side of the metal foil construction is to the tacky surface of the cutting board surface. The pressure and temperature depend on the adhesive. This is followed later by adhering the second plastic film coated with adhesive to the first plastic coated with the metal foil construction in between by applying pressure and temperature sufficient to melt the adhesive to a tacky state sufficient to adhere to each other and cooling where the bond is permanent. This pressure and temperature also depend on the adhesive.

In some embodiments, the adhesive used on the two plastic films coated with adhesive is a thermoset adhesive that is a curable adhesive that is 100% solid at 30° C., softens to a tacky phase in temperature ranges of 80-300° C., and cures when exposed to temperatures above for a time of at least 15 minutes to solidify at temperatures up to 300° C. The thermoset adhesive on the two plastic films coated with adhesive is from a group consisting of a natural or synthetic rubber, an acrylic polymer, a silicone, a modified epoxy, or a blend containing nitrile rubber and a phenolic resin. The hardening or setting temperature for thermoset adhesives made of synthetic rubber is around 130° C., acrylic polymer is around 170° C., and silicone polymer is around 200° C. The time to achieve complete hardness or set time for these types of thermoset adhesives is, respectfully, 2 hrs., 2 hrs., and 3 hrs. when in conjunction with pressure.

The adhering of the two thermoset adhesive layers to relevant surfaces in the metal foil heater also occurs in two steps. The adhering of the first plastic film coated with adhesive to the cutting platform with the metal foil construction is done by applying pressure and temperature for a short time sufficient to melt the adhesive to a tacky state sufficient to adhere to each other followed by removing the first plastic film coated with adhesive in contact with to the cutting platform with the metal foil construction of the releasably adhering surface of the cutting platform before the thermoplastic adhesive cools enough to bond to the releasably adhering surface when the surface is tacky. The adhering of the second plastic film coated with adhesive to the first plastic coated with the metal foil construction is done by applying pressure and temperature sufficient to melt the adhesive to a tacky state sufficient to adhere to each other, leaving it at that pressure temperature for enough time to cure the adhesive and form a permanent bond.

The adhesive layers within the two adhesive coated plastic sheets may be the same or different within the same flexible metal foil heater if they are of the same type, i.e., pressure-sensitive adhesive, thermoplastic adhesive, or thermoset adhesive.

Another step is providing a cutting platform having a satisfactorily releasably adherable surface configured (1) to hold the metal foil sheet construction in place while it is being cut into a foil heating circuit image and a background image and (2) to release the background image when the background image is removed from the releasably adherable surface.

In some embodiments several aspects are further described. In some, the cutting instrument is at least one blade. The releasably adhering surface of the cutting platform is a tacky surface configured to maintain an ability (1) to hold the metal foil sheet construction in place while it is being cut into a foil heating circuit image and a background image and (2) to releasing the background image when the background image is peeled from the tacky surface under repeated exposure to conditions to achieve temporary adhesion between the adhesive surface to the second side of the metal foil sheet construction left on the cutting platform and repeated removal of a metal foil sheet construction and a plastic side of a plastic sheet coated with adhesive, The cutting platform further comprises a base configured to maintain a uniform flat shape under repeated exposure to conditions to achieve temporary adhesion between the adhesive surface of the first adhesive coated adhesive sheet to the second side of the metal foil sheet construction left on the cutting platform, In addition, a later step of placing the first plastic coated adhesive sheet in contact with the cutting platform and the metal foil sheet construction comprises placing the first plastic coated adhesive sheet on top of the cutting platform and the metal foil sheet construction in the shape of the image of the metal foil heating circuit with the adhesive surface contacting the second side of the metal foil sheet construction in the shape of the metal foil heating circuit and the tacky surface of the cutting board, Also, a later step of removing the plastic sheet coated with adhesive and the metal foil sheet construction off the cutting platform comprises several steps. One is temporarily adhering the first plastic coated adhesive sheet to the second side of the metal foil sheet construction in the shape of the metal foil heating circuit on the cutting platform at a pressure and temperature configured to adhere the adhesive surface of the plastic coated adhesive sheet to the second side of the metal foil sheet construction in the shape of the metal foil heating circuit on the cutting platform with a second adhesion force that is greater than the first adhesion force between the metal foil and the tacky surface of the cutting board. Another is removing the plastic sheet coated with adhesive and the metal foil sheet construction from the cutting platform to expose the first metal surface of the metal foil construction in the shape of the metal foil heating circuit before the plastic-coated adhesive sheet and the tacky surface cannot be removed by pealing.

In some embodiments where the cutting instrument is at least one blade, the tacky surface is made satisfactorily tacky by application of more adhesive over the tacky adhesive surface when it is no longer satisfactorily tacky.

In some embodiments where the cutting instrument is at least one blade, the base board comprises, the tacky surface comprises a tacky surface element that has repositionable adhesion to the metal foil construction and the base comprises at least four additional elements. The first element is a cuttable surface element having a top and a bottom with the top adhered to the tacky surface and able to receive the tip of a blade to insure complete cutting through the metal foil construction. The second element is a first heat conductive metal layer having a top and a bottom with the top adhered to the cuttable surface and able to transfer heat upward from the bottom. The third element is a hard surface element layer having a top and a bottom with the top that resists being cut by a blade and supports parts of the invention through heat and pressure events that follow to make the foil heater. The fourth element is a second heat conductive metal layer having a top and a bottom with the top adhered to the hard surface and able to transfer heat upward from the bottom. When the adhesive of the plastic-coated adhesive sheets are pressure sensitive adhesives, the cutting board does not need the second and fourth element as there is no heat to dissipate.

In some embodiments the cutting instrument is at least one laser. In these embodiments, the releasably adhering surface of the cutting platform is a surface able to create a vacuum intense enough to hold a metal foil construction uniformly while the metal foil construction is being cut into an image and a background and weak enough to allow the background to be removed from the surface of the cutting platform while retaining the metal foil construction image, and able to be turned off to permit the metal foil image to lie on the adhesive side of the first plastic coated adhesive sheet. The cutting platform further comprises a base configured to maintain a uniform flat shape under repeated exposure to conditions to achieve temporary adhesion between the adhesive surface of the first adhesive coated adhesive sheet to the second side of the metal foil sheet construction left on the cutting platform.

In addition, the later step of placing the first plastic coated adhesive sheet in contact with the cutting platform and the metal foil sheet construction comprises placing the first plastic coated adhesive sheet on top of the cutting platform and the metal foil sheet construction in the shape of the image of the metal foil heating circuit with the adhesive surface contacting the second side of the metal foil sheet construction in the shape of the metal foil heating circuit and the removably adhering surface of the cutting board.

Also, the later step of removing the plastic sheet coated with adhesive and the metal foil sheet construction off the cutting platform comprises several steps. One is flipping the cutting platform over a clean surface so the adhesive surface contacting the second side of the metal foil sheet construction in the shape of the metal foil heating circuit is below the removably adhering surface of the cutting board. Another is turning the vacuum off. Still another is removing the plastic sheet coated with adhesive and the metal foil sheet construction from the cutting platform to expose the first metal surface of the metal foil construction in the shape of the metal foil heating circuit before the plastic-coated adhesive sheet.

In some embodiments where the cutting instrument is at least one laser, the vacuum is created over a porous surface through which air is sucked while the vacuum is being created.

In some embodiments where the cutting instrument is at least one laser, the base board comprises at least two elements. The first element is the releasably adhering surface comprising a low release surface an porous surface configured not to adhere to the first side adhesive surface of the first and second plastic coated adhesive sheets. The second comprises the base comprising two additional features. The first feature is a cuttable surface element having a top and a bottom with the top adhered to the releasably adhering surface and able to receive the tip of a laser beam to insure complete cutting through the metal foil construction. The second feature is a chamber in communication with the releasably adhering surface to confine a vacuum atmosphere to maintain a suction on the metal foil construction when it is upon the releasably adhering surface that may be turned off when desired.

Still another step is placing the metal foil sheet construction on top of the releasably adhering surface of the cutting platform with the first metal side contacting the releasably adhering surface of the cutting platform with a first adhesion force and the second side facing outward from the releasably adherable surface. This step has at least two variation s discussed above depending on whether the cutting instrument is at least one blade or at least one laser.

Another step is communicating a line drawing of a graphic image of a foil heating circuit and a background image to a cutter apparatus with at least one cutting instrument. Line drawings may be created in the form of electronic drawings by various methods such as, for example, use of publication software.

Still another step is interacting the cutting platform and the metal foil sheet construction with the cutter apparatus configured to use at least one cutting instrument to trace along the line drawing of the graphic image and completely thorough the metal foil sheet construction to create a metal foil image sheet of a metal foil heating circuit having a first metal side and a second side and a background image sheet of spaces. In some embodiments, the cutting platform is mobile. In some embodiments, the cutter apparatus is mobile. In some embodiments, both the cutting platform and the cutter apparatus are mobile.

Another step is making at least two openings through the second plastic coated adhesive sheet to expose at least two terminals of the metal side of the metal foil sheet construction in the shape of the metal foil heating circuit on the first plastic coated adhesive sheet through the second plastic coated adhesive sheet. In some embodiments, depending on the requirements of a specific application, more than one independent heating circuit may be used, each with a pair of terminal ends. These terminals are the pair of ends of each independent circuit.

Another step is placing the first adhesive layer of the first plastic coated adhesive sheet in adherable contact with the second side of the metal foil image sheet and placing the second adhesive layer of the second plastic coated adhesive sheet in adherable contact with the metal foil side of the metal foil image sheet wherein the metal foil at the terminals is exposed to form a metal foil heater.

In some embodiments, the last step may be expanded to include the six additional steps.

One step is peeling the background image from the releasably adherable surface and leaving behind the metal foil sheet construction in the shape of the image of the metal foil heating circuit on the cutting platform with the second side of the metal foil construction in the shape of the image of the metal foil heating circuit facing outward from the releasably adherable surface.

Another step is placing the first plastic coated adhesive sheet in contact with the cutting platform and the metal foil sheet construction in the shape of the image of the metal foil heating circuit with the adhesive surface contacting the second side of the metal foil sheet construction in the shape of the metal foil heating circuit and the releasably adherable surface of the cutting board. As discussed above, the pressure and temperature used to obtain satisfactory adhesion varies with the first adhesive used.

Well known methods of applying the pressure and temperature may be used. One such method for a particular thermoplastic adhesive is use of a 2 in diameter nip roll at a temperature of 138° C. running at 0.6 to 0.8 inches per sec. Another such method for a particular thermoset adhesive is use of a 2 in diameter nip roll at a temperature of 93° C. running at 0.6 to 0.8 inches per sec to soften to a tacky state but not cure the adhesive.

Still another step is removing the plastic sheet coated with adhesive and the metal foil sheet construction off the cutting platform to expose the first metal surface of the metal foil construction in the shape of the metal foil heating circuit.

Another step is placing the second plastic coated adhesive sheet over the first plastic coated adhesive sheet with the adhesive surface of the second plastic coated adhesive sheet contacting the first metal foil surface in the shape of the metal foil heating circuit a pair of terminals and the adhesive surface of the first plastic coated sheet and the at least two terminals, areas of metal foil, are exposed to air through the at least two openings in the second plastic coated adhesive sheet.

Still another step is permanently adhering the second plastic coated adhesive sheet to the first plastic coated adhesive sheet and the first metal side in the shape of the metal foil heating circuit and permanently adhering the first plastic coated adhesive sheet to the second side of the metal foil sheet construction in the shape of the metal foil heating circuit.

Well known methods of applying the pressure and temperature may be used. One such method for a particular thermoplastic adhesive is use of a 2 in diameter nip roll at a temperature of 149° C. running at 0.4 inches per sec. Another such method for a particular thermoset adhesive is use of a press exerting 100 psi in an oven set at for 15 minutes to cure the first and second adhesive layers in the metal foil heater.

Another step is attaching wires securely to the exposed metal in the at least two openings to create the metal foil heater with at least one connector element to make a flexible foil heater. The at least one connector element connects to the exposed metal foil of the at least one pair of terminals and is configured to electrically connect to a power source to supply electricity to the flexible metal foil heater during prolonged use. It is connectable to at least one power source. Connectors are used to attach wires to terminals and to sources of power. One type of connector is capped solder connector to attach two exposed wire ends to the exposed foil from the terminals. The solder point is generally covered by a cap, such as, for example, epoxies, UV curable adhesives, and glue that is hardened or a potting compound to protect the solder connection from strain to minimize undesirable separation or fracturing of the joint. Another type of protection is a strain relief box with a top and bottom sections that may or may not be connected by a hinge. The bottom has an opening large enough to provide access to the exposed terminals on the foil circuit through the holes in the second adhesive coated plastic sheet. The bottom is adhered to the plastic layer and two wires are laid on groves in the bottom section to physically hold the wires. The bottom section provides rigid support of the joint so that no flexing can occur of the solder joints of the wires that are soldered to the terminals. The top is attached and securely fastened to the bottom that holds the wires in place in the grooves of the bottom section, together preventing the wire from bending in a manner that could introduce flexing of the joint caused by mechanical action of the wire or by general flexing of the foil layer itself, thereby risking damage of the joint. Furthermore, the top section provides electrical insulation.

In the method of making a foil heater for prolonged use at a use temperature comprises, all plastics, adhesives, and solder in the metal foil heater function as intended at use temperatures. Above use temperatures, one or more may soften, melt, degrade to no longer function as intended.

Figures are included to illustrate some the results of the method invention described above. FIG. 1 is a perspective view of the embodiment of a flexible foil heater made by the method of the invention. A flexible metal foil heater (100) is shown with a second adhesive coated plastic film sheet (140), a metal foil construction (120) visible through second adhesive coated film sheet 140 and a connector (150) with wires (152). A first adhesive coated plastic sheet (110) is underneath and not visible in this figure.

Figure 2:
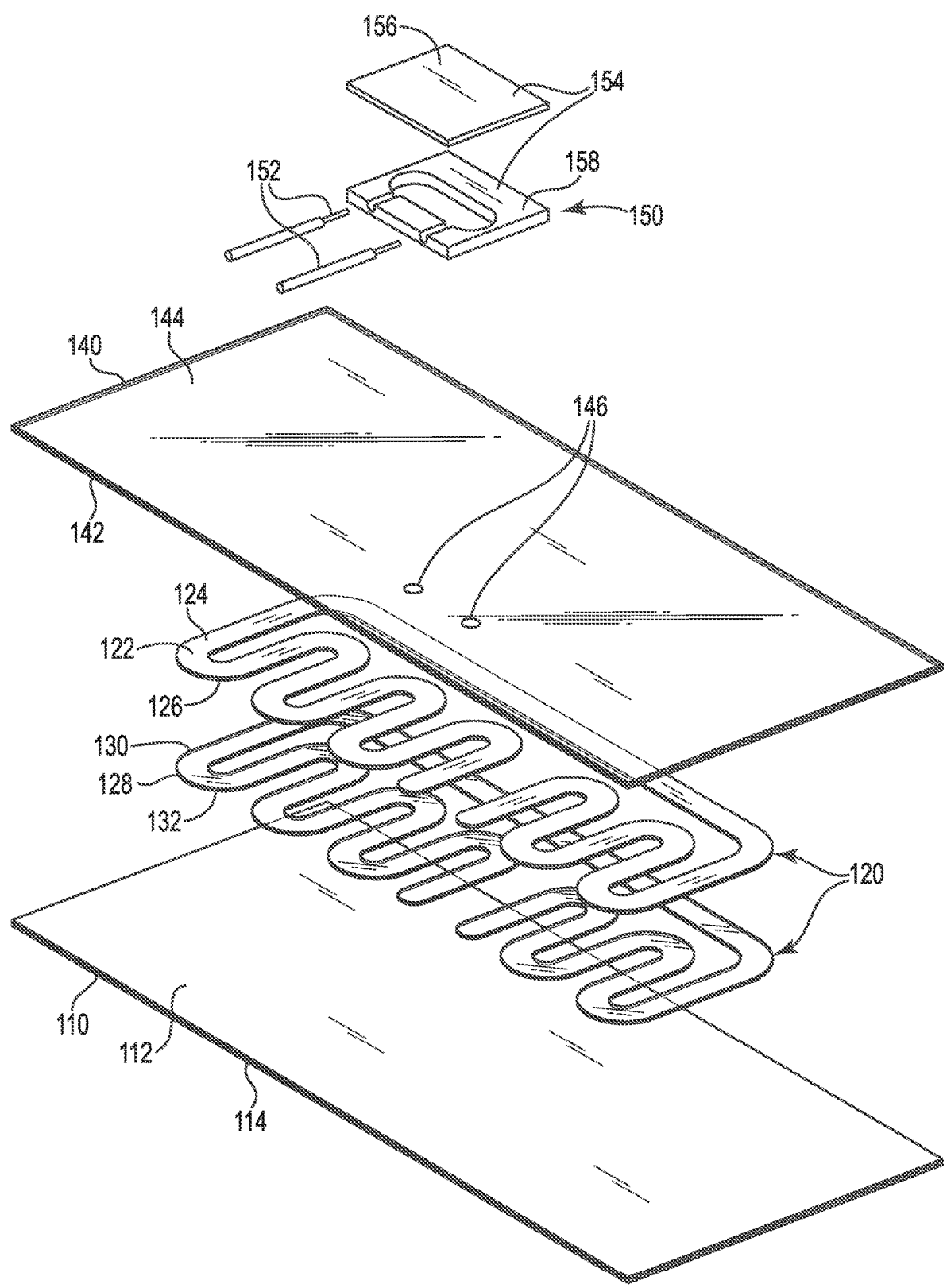
FIG. 2 is an exploded perspective view of the embodiment shown in FIG. 1.

FIG. 2 is an exploded perspective view of the embodiment of FIG. 1. Flexible metal foil heater 100 is shown with first adhesive coated plastic film 110. A metal foil construction (120) is shown with two parts, a metal foil heating circuit (122) having a first side (124) and a second side (126), and an adhering plastic support layer (128) having the same shape as metal foil heating circuit 122 has a first side (130) and a second side (132). Second adhesive coated plastic sheet 140 is next with an adhesive side (142) contacting metal foil first side 124 and a plastic side (144). Two holes (146) expose the first side of metal foil heating circuit 124 at its terminal ends. A connector (150) made of wired (152) and a casing (154) having a top (156) and a bottom (158) with an opening over the exposed terminal ends is configures to attached to a power source, not shown.

Figure 3:
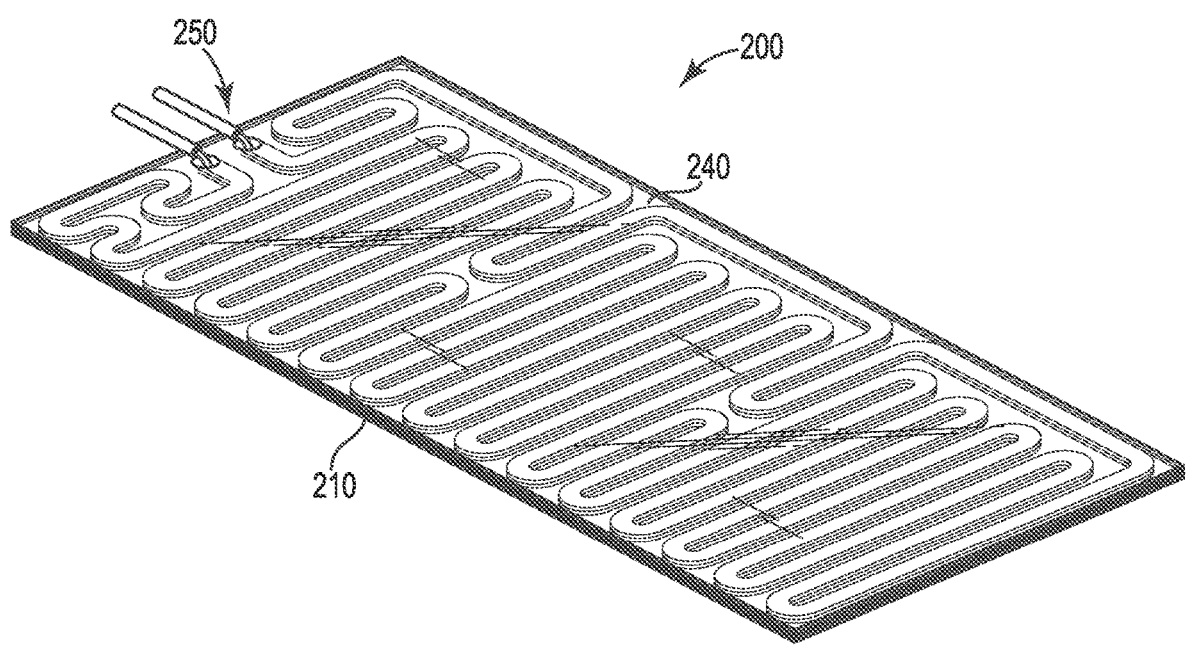
FIG. 3 is a perspective view of an embodiment of a flexible foil heater made by the method of the invention with a different pattern and electrical connector.

FIG. 3 is a perspective view of the embodiment of a flexible foil heater made by the method of the invention with a different pattern and electrical connector. A flexible metal foil heater (200) is shown with a second adhesive coated plastic film sheet (240), a metal foil construction (220) visible through second adhesive coated film sheet 240 and a connector (250) with wires (252). A first adhesive coated plastic sheet (210) is underneath and not visible in this figure.

Figure 4:
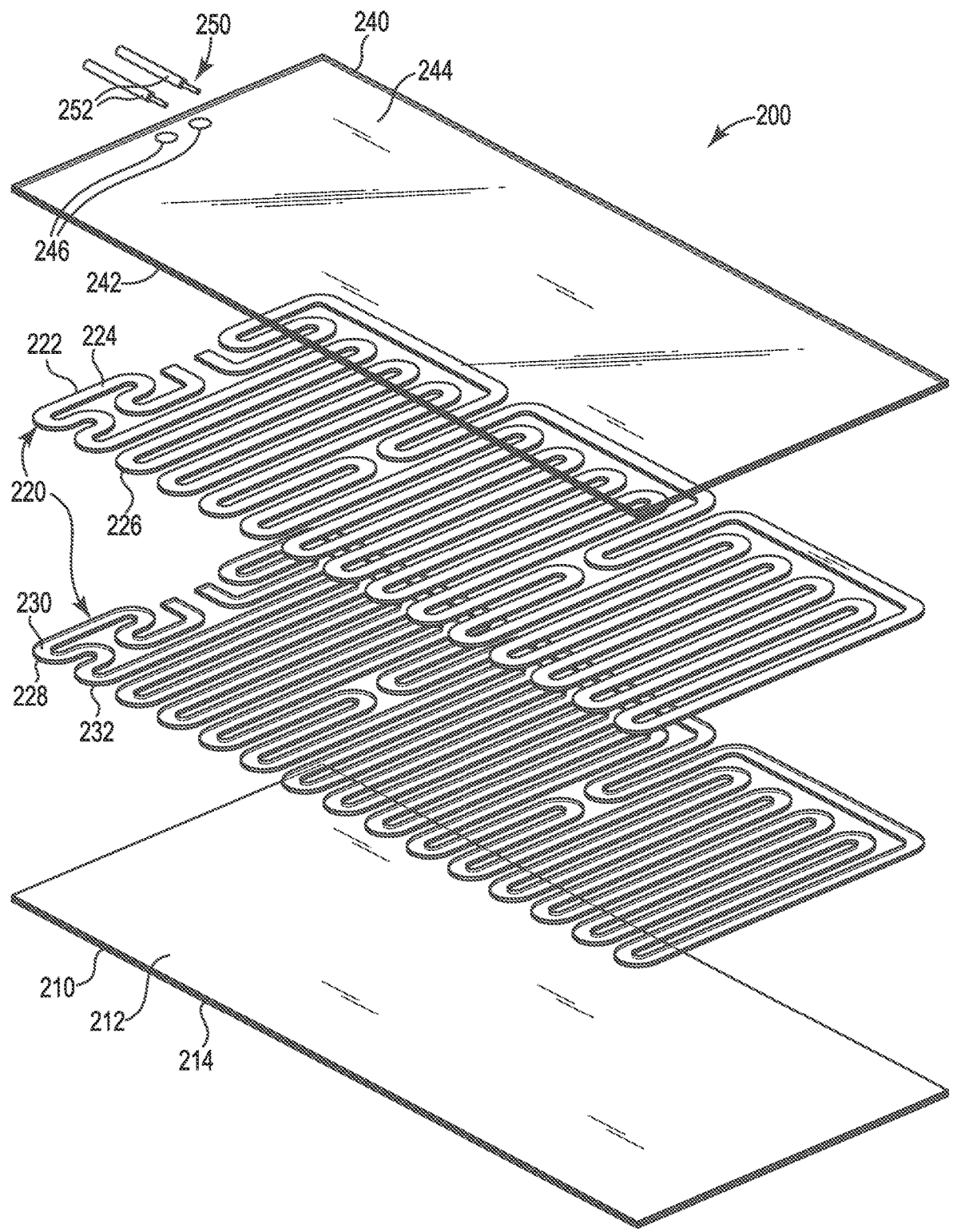
FIG. 4 is an exploded perspective view of the embodiment shown in FIG. 3.

FIG. 4 is an exploded perspective view of the embodiment of FIG. 3. Flexible metal foil heater 200 is shown with first adhesive coated plastic film 210. A metal foil construction (220) is shown with two parts, a metal foil heating circuit (222) having a first side (224) and a second side (226), and an adhering plastic support layer (228) having the same shape as metal foil heating circuit 222 has a first side (230) and a second side (232). Second adhesive coated plastic sheet 240 is next with an adhesive side (242) contacting metal foil first side 224 and a plastic side (244). Two holes (246) expose the first side of metal foil heating circuit 124 at its terminal ends. A connector (250) made of wired (252) soldered to exposed metal foil terminals. The solder point is covered with a cap (not shown) to protect the solder point from strain-induced separation. The connector is configured to attached to a power source, not shown.

Figure 5:
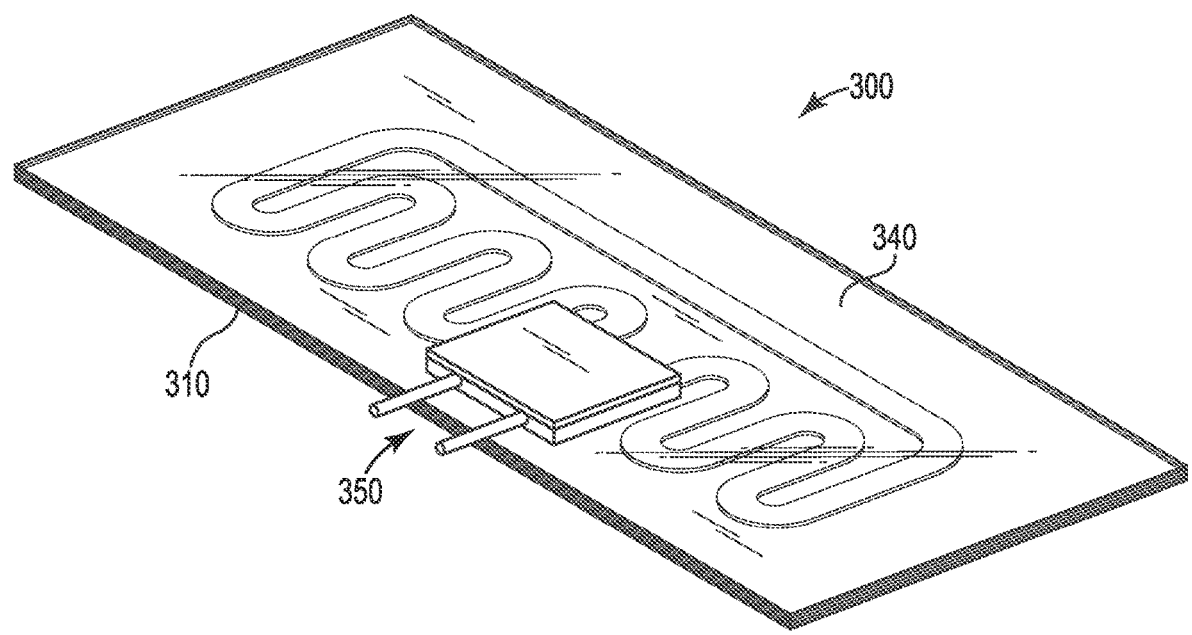
FIG. 5 is a perspective view of the embodiment of a foil heater made by the method of the invention with a metal foil heater circuit without a film backing.

FIG. 5 is a perspective view of the embodiment of a foil heater made by the method of the invention with a metal foil heater circuit without a film backing. A flexible metal foil heater (300) is shown with a second adhesive coated plastic film sheet (340), a metal foil construction (320) visible through second adhesive coated film sheet 340 and a connector (350) with wires (352). A first adhesive coated plastic sheet (310) is underneath and not visible in this figure.

Figure 6:
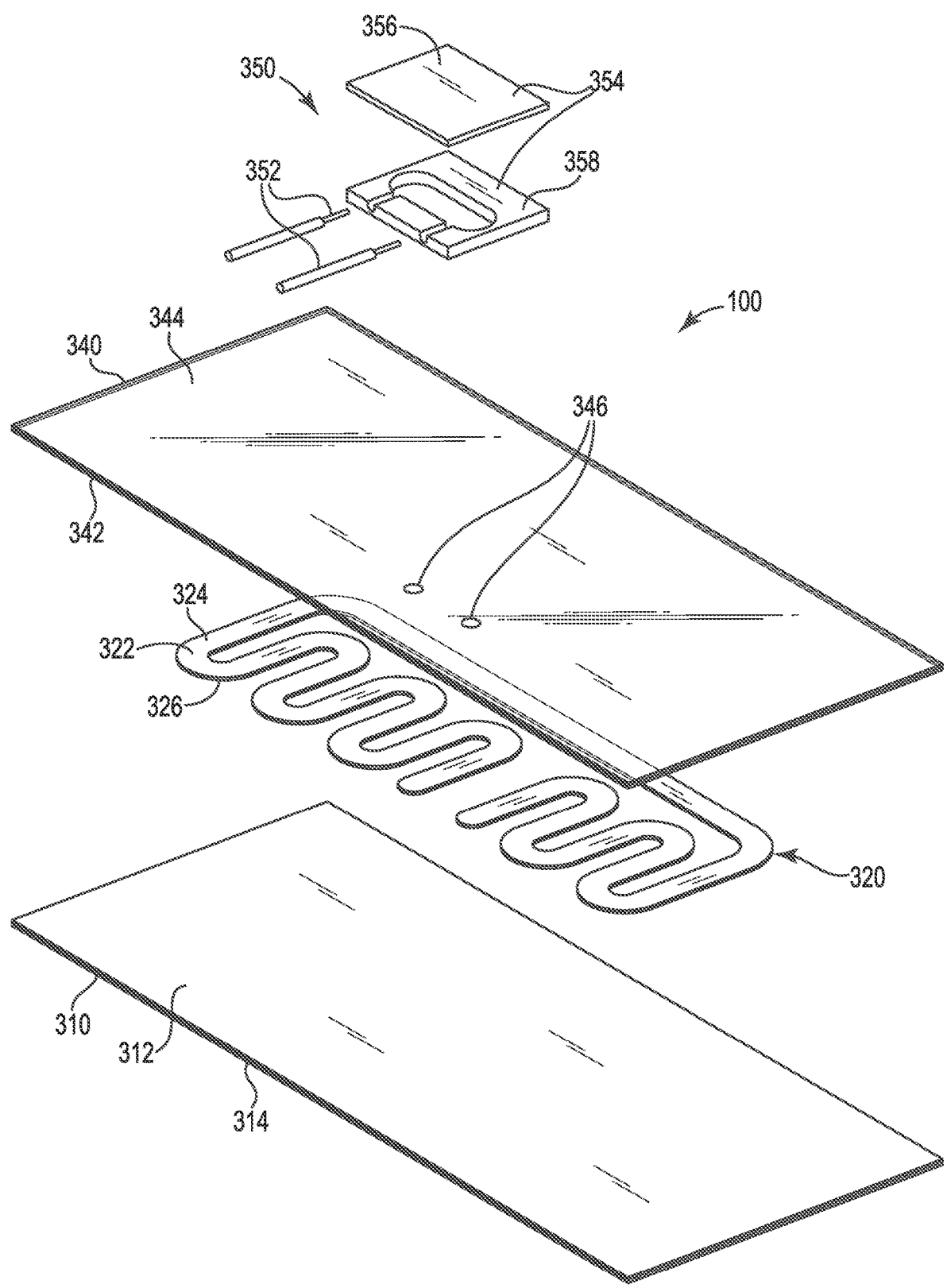
FIG. 6 is an exploded perspective view of the embodiment shown in FIG. 5.

FIG. 6 is an exploded perspective view of the embodiment shown in FIG. 5. Flexible metal foil heater 300 is shown with first adhesive coated plastic film 110. A metal foil construction (320) is shown with one part, a metal foil heating circuit (322) that has a first side (324) and a second side (326). Second adhesive coated plastic sheet 340 is next with an adhesive side (342) contacting metal foil first side 324 and a plastic side (344). Two holes (346) expose the first side of metal foil heating circuit 324 at its terminal ends. A connector (350) made of wired (352 and a casing (354) having a top (356) and a bottom (358) with an opening over the exposed terminal ends is configures to attached to a power source, not shown.

What is claimed is:

1. A method of making a foil heater for prolonged use at a use temperature comprising the steps of;
   the providing a metal foil sheet construction comprised of a metal foil that comprises a first metal side and a second side, and the metal foil is electrically conductive and has a thickness;
   providing a first plastic coated adhesive sheet with a first adhesive layer having an adhesive surface on a first side and a first plastic layer having a plastic surface on a second side and a second plastic coated adhesive sheet with a second adhesive layer having an adhesive surface on a first side and a second plastic layer having a plastic surface on a second side;
   providing a cutting platform having a releasably adherable surface configured (1) to hold the metal foil sheet construction in place while it is being cut into a foil heating circuit image and a background image and (2) to release the background image when the background image is removed from the releasably adherable surface;
   placing the metal foil sheet construction on top of the releasably adherable surface of the cutting platform with the first metal side of the metal foil sheet construction contacting the releasably adherable surface of the cutting platform with a first adhesion force and the second side of the metal foil sheet construction facing outward from the releasably adherable surface;
   communicating a line drawing of a graphic image of the foil heating circuit image and the background image to a cutter apparatus with at least one cutting instrument;
   interacting the cutting platform and the metal foil sheet construction with the cutter apparatus configured to use the at least one cutting instrument to trace along the line drawing of the graphic image and to completely cut thorough the metal foil sheet construction to create a metal foil image sheet in the shape of a metal foil heating circuit having a first metal side of the metal foil image sheet and a second side of the metal foil image sheet and a background image of spaces;
   making at least two openings through the second plastic coated adhesive sheet configured to expose at least two terminals on the first metal side of the metal foil image sheet in the shape of the metal foil heating circuit on the first plastic coated adhesive sheet through the second plastic coated adhesive sheet when the second adhesive layer of the second plastic coated adhesive sheet contacts the first metal side of the metal foil image sheet in the shape of the metal foil heating circuit; and
   placing the first adhesive layer of the first plastic coated adhesive sheet in adherable contact with the second side of the metal foil image sheet in the shape of the metal foil heating circuit and placing the second adhesive layer of the second plastic coated adhesive sheet in adherable contact with the first metal side of the metal foil image sheet in the shape of the metal foil heating circuit wherein the first metal foil side of the metal foil image sheet has at least two terminals exposed to form a metal foil heater,
   wherein all plastics and adhesives of the metal foil sheet construction, the first plastic coated adhesive sheet, and the second plastic coated adhesive sheet in the metal foil heater have a softening point and a melting point above a temperature of use of the metal foil heater.

2. The method of claim 1 wherein the step of placing the first adhesive layer of the first plastic coated adhesive sheet in adherable contact with the second side of the metal foil image sheet and placing the second adhesive layer of the second plastic coated adhesive sheet in adherable contact with the first metal side of the metal foil image sheet in the shape of the metal foil heating circuit wherein the at least two terminals of the first metal side of the metal foil image sheet are exposed to form the metal foil heater further comprises the steps of:
   peeling the background image of spaces from the releasably adherable surface and leaving the first metal side of the metal foil image sheet in the shape of the metal foil heating circuit with the at least two terminals on the cutting platform with the second side of the metal foil image sheet in the shape of the metal foil heating circuit facing outward from the releasably adherable surface;
   placing the first plastic coated adhesive sheet in contact with the cutting platform and the metal foil image sheet in the shape of the metal foil heating circuit with the adhesive surface on the first side of the first plastic coated adhesive sheet contacting the second side of the metal foil image sheet in the shape of the metal foil heating circuit and the releasably adherable surface of the cutting platform;
   removing the first plastic coated adhesive sheet and the metal foil image sheet off the cutting platform to expose the first metal side of the metal foil image sheet in the shape of the metal foil heating circuit;
   placing the second plastic coated adhesive sheet over the first plastic coated adhesive sheet with the adhesive surface of the second plastic coated adhesive sheet contacting the first metal side of the metal foil image sheet in the shape of the metal foil heating circuit and the adhesive surface of the first plastic coated adhesive sheet, and the at least two terminals or areas of metal foil image sheet are exposed to air through the at least two openings in the second plastic coated adhesive sheet;
   permanently adhering the second plastic coated adhesive sheet to the first plastic coated adhesive sheet and the first metal side of the metal foil image sheet the shape of the metal foil heating circuit and permanently adhering the first plastic coated adhesive sheet to the second side of the metal foil image sheet in the shape of the metal foil heating circuit; and
   attaching wires to the at least two terminals or exposed metal of at least one pair of the at least two openings with at least one connector to create the metal foil heater.

3. The method of claim 2,
   wherein the at least one cutting instrument is at least one blade,
   wherein the releasably adherable surface of the cutting platform is a tacky surface configured to maintain an ability repeatedly (1) to hold the metal foil sheet construction in place while it is being cut into the metal foil image sheet in the shape of the metal foil heating circuit and the background image of spaces, (2) to release the background image of spaces when the background image of spaces is peeled from the tacky surface, (3) to permit achievement of temporary adhesion between the adhesive surface of first plastic coated adhesive sheet to the second side of the metal foil image sheet of metal foil heating circuits left on the cutting platform and (4) to remove the metal foil image sheet in the shape of the metal foil heating circuits and the first plastic coated adhesive sheet once adhered, wherein the cutting platform further comprises a base configured to maintain a uniform flat shape under repeated exposure to conditions to achieve temporary adhesion between the adhesive surface of the first adhesive sheet to the second side of the metal foil Image sheet in the shape of metal foil heating circuits left on the cutting platform, wherein the step of placing the first plastic coated adhesive sheet in contact with the cutting platform and the metal foil image sheet in the shape of the metal foil heating circuit comprises placing the first plastic coated adhesive sheet on top of the cutting platform and the metal foil image sheet in the shape of the metal foil heating circuit with the adhesive surface of the first plastic coated adhesive sheet contacting the second side of the metal foil image sheet in the shape of the metal foil heating circuit and the tacky surface of the cutting platform, wherein the step of removing the first plastic sheet coated adhesive sheet and the metal foil image sheet off the cutting platform comprises the steps of temporarily adhering the first plastic coated adhesive sheet to the second side of the metal foil image sheet in the shape of the metal foil heating circuit on the cutting platform at a pressure and temperature configured to adhere the adhesive surface of the first plastic coated adhesive sheet to the second side of the metal foil image sheet in the shape of the metal foil heating circuit on the cutting platform with a second adhesion force that is greater than a first adhesion force between the first metal side of the metal foil sheet construction and the releasably adherable surface of the cutting platform, and removing the first plastic coated adhesive sheet and the metal foil image sheet in the shape of the metal foil heating circuit off the cutting platform to expose the first metal surface of the metal foil mage image sheet in the shape of the metal foil heating circuit before the first plastic coated adhesive sheet and the tacky surface of the cutting platform cannot be removed by peeling.

4. The method of claim 3 wherein the tacky surface is made tacky by application of more adhesive over the tacky surface when it is no longer tacky.

5. The method of claim 3 where the base of the cutting platform comprises, the tacky surface comprising a tacky surface element that has repositionable adhesion to the metal foil sheet construction and the base comprising a cuttable surface element having a top and a bottom with the top adhered to the tacky surface and able to receive a tip of the at least one blade to insure complete cutting through of the metal foil sheet construction, a first heat conductive metal layer having a top and a bottom with the top of the heat first conductive metal layer adhered to the cuttable surface element and able to transfer heat upward from the bottom of the first heat conductive metal layer, a hard surface element layer having a top and a bottom with the top of the hard surface element layer that resists being cut by the at least one blade and supports (1) the first plastic coated adhesive sheet in contact with the metal foil image sheet in the shape of the metal foil heating circuit and (2) the first plastic coated adhesive sheet in contact with the metal foil image sheet in the shape of the metal foil heating circuit and the second plastic coated adhesive sheet in contact with the first metal side of the metal foil image sheet in the shape of the metal foil heating circuit through heat and pressure to have adhesion between 1) the first plastic coated adhesive sheet in contact with the metal foil image sheet in the shape of the metal foil heating circuit and (2) the first plastic coated adhesive sheet in contact with the metal foil image sheet in the shape of the metal foil heating circuit and the second plastic coated adhesive sheet in contact with the first metal side of the metal foil image sheet in the shape of the metal foil heating circuit to make the foil heater, and a second heat conductive metal layer having a top and a bottom with the top of the second heat conductive metal layer adhered to the hard surface element layer and able to transfer heat upward from the bottom of the second heat conductive metal layer.

6. The method of claim 2, wherein the at least one cutting instrument is at least one laser, wherein the releasably adherable surface of the cutting platform is a surface able to create vacuum to hold the metal foil sheet construction uniformly while the metal foil sheet construction is being cut into the metal foil image sheet in the shape of the metal foil heating circuit and the background image of spaces and to allow the background image of spaces to be removed from the releasably adherable surface of the cutting platform while retaining the metal foil image sheet in the shape of the metal foil heating circuit, the vacuum capable of being turned off to permit the metal foil image sheet in the shape of the metal foil heating circuit to lie on the adhesive surface of the first plastic coated adhesive sheet, wherein the cutting platform further comprises a base configured to maintain a uniform flat shape under repeated exposure to conditions to achieve temporary adhesion between the adhesive surface of the first plastic coated adhesive sheet and the second side of the metal foil image sheet in the shape of the metal foil heating circuit left on the cutting platform, wherein the step of placing the first plastic coated adhesive sheet in contact with the cutting platform and the metal foil image sheet in the shape of the metal foil heating circuit comprises placing the first plastic coated adhesive sheet on top of the cutting platform and the metal foil image sheet in the shape of the metal foil heating circuit with the adhesive surface of the firsts plastic coated adhesive sheet contacting the second side of the metal foil image sheet in the shape of the metal foil heating circuit and the removably adherable surface of the cutting platform, wherein the step of removing the first plastic coated adhesive sheet and the metal foil image sheet in the shape of the metal foil heating circuit off the cutting platform comprises the steps of flipping the cutting platform over a clean surface so the adhesive surface of the first plastic coated adhesive sheet contacting the second side of the metal foil image sheet in the shape of the metal foil heating circuit is below the removably adhering surface of the cutting platform and turning the vacuum off and removing the first plastic coated adhesive sheet and the metal foil image sheet in the shape of the metal foil heating circuit from the cutting platform to expose the first metal side of the metal foil image sheet in the shape of the metal foil heating circuit.

7. The method of claim 6 wherein the vacuum is created over a porous surface through which air is sucked while the vacuum is being created.

8. The method of claim 6 where the cutting platform comprises, the releasably adhering surface comprising a low release surface and porous surface configured not to adhere to the adhesive surface on the adhesive layer of the first plastic coated adhesive sheet and the adhesive surface of the first side of the second plastic coated adhesive sheet and the base of the cutting platform comprising a cuttable surface element having a top and a bottom with the top of the cuttable surface element adhered to the releasably adherable surface and able to receive a tip of a laser beam to insure complete cutting through the metal foil sheet construction, a chamber in communication with the releasably adherable surface to confine a vacuum atmosphere to maintain a suction on the metal foil image sheet in the shape of the metal foil heating circuit from the cutting platform to expose the first metal side of the metal foil image sheet in the shape of the metal foil heating circuit when it is upon the releasably adherable surface that is turned off when the metal foil image sheet is to be removed.

9. The method of claim 2 wherein the metal foil sheet construction comprises the the metal foil with the first metal side and the second metal side, the metal foil having a thickness of between 0.3 mils and 3.0 mils, a bonding layer comprising an adhesive attached to the second side of the metal foil sheet construction, and a plastic support layer having a first side attached to the bonding layer.

10. The method of claim 9 wherein the plastic support layer in the metal foil sheet construction comprises a flexible dielectric material that is from a group consisting of polyester, polypropylene, high density polyethylene, low density polyethylene, polyimide, polytetrafluoroethylene, polyvinyl chloride, nylon, and glass epoxy blends.

11. The method of claim 2 wherein the metal foil sheet construction comprises, only one layer of the metal foil having a thickness of greater than 3.0 mils, the second side of the metal foil sheet construction is metal, and the metal foil sheet construction is configured to be laid flat, resist tearing when removed from the releasably adherable surface of the cutting platform, and be flexible to enable the metal foil heater to be bent around a 0.050-inch diameter mandrel without inducing permanent deformation.

12. The method of claim 2 wherein the metal foil sheet construction comprises the metal foil that is a resistive foil and made from metals from a group consisting of nickel, copper, nickel-copper, constantan, aluminum, and stainless steel.

13. The method of claim 2 wherein the first plastic layer of the first plastic coated adhesive sheet and the second plastic layer of the second plastic coated adhesive sheet comprise a plastic that is a flexible dielectric material that is from a group consisting of polyester, polypropylene, high density polyethylene, low density polyethylene, polyimide, polytetrafluoroethylene, polyvinyl chloride, nylon, and glass epoxy blends.

14. The method of claim 2 wherein the first adhesive layer of the first plastic coated adhesive sheet and the second adhesive layer of the second plastic coated adhesive sheet comprise an adhesive that is a pressure sensitive adhesive and adhering the first plastic coated adhesive sheet and the second plastic coated adhesive sheet to the metal foil image sheet in the shape of the metal foil heating circuit is done with a pressure of less than 50 psi at 30° C.

15. The method of claim 14 wherein the pressure sensitive adhesive on the first plastic coated adhesive sheet and the second plastic coated adhesive sheet is from a group consisting of acrylic, silicone, rubber, silicone-rubber, and modified epoxy.

16. The method of claim 2 wherein the first adhesive layer of the first plastic coated adhesive sheet and the second adhesive layer of the second plastic coated adhesive sheet comprise a thermoplastic adhesive, wherein adhering the first plastic coated adhesive sheet to the releasably adherable surface of the cutting platform with the metal foil image sheet in the shape of the metal foil heating circuit is done by applying pressure and heat sufficient to melt the first adhesive layer of the first plastic coated adhesive sheet to a tacky state sufficient to adhere the first plastic coated adhesive sheet to the releasably adherable surface of the cutting platform with the metal foil image sheet in the shape of the metal foil beating circuit followed by removing the first plastic coated adhesive sheet in contact with the releasably adherable surface of the cutting platform with the metal foil image sheet in the shape of the metal foil heating circuit from the releasably adherable surface of the cutting platform when the adhesive surface of the first adhesive layer of the first plastic coated adhesive sheet is tacky before the thermoplastic adhesive of the first adhesive layer cools enough to bond to the releasably adherable surface of the cutting board, and wherein adhering the second plastic coated adhesive sheet to the first plastic coated adhesive sheet with the metal foil image sheet in the shape of the metal foil circuit is done by applying pressure and heat sufficient to melt the first adhesive layer of the first plastic co td adhesive sheet and the second adhesive layer of the second plastic coated adhesive sheet to a tacky state sufficient to adhere to each other and cooling to form a permanent bond.

17. The method of claim 16 wherein the thermoplastic adhesive of the first adhesive layer is a hot melt adhesive that is 100% solid at 30° C. melts to a partially liquid phase in temperature ranges of 80-200° C. and solidifies to form bonding when it is cooled to temperature of use.

18. The method of claim 16 wherein the thermoplastic adhesive on the first plastic coated adhesive sheet and the second plastic coated adhesive sheet is from a group consisting of polyolefin, polyamide, polyester, polyurethane, and styrene-butadiene copolymers.

19. The method of claim 2,
wherein the first adhesive layer of the first plastic coated adhesive sheet and the second adhesive layer of the second plastic coated adhesive sheet comprise a thermoset adhesive,
wherein adhering the first plastic coated adhesive sheet to the cutting platform with the metal foil image sheet in the shape of the metal foil heating circuit is done by applying pressure and heat for a time sufficient to melt the thermoset adhesive of the first adhesive layer of the first plastic coated adhesive sheet and the second adhesive layer of the second plastic coated adhesive sheet to a tacky state sufficient to adhere the first plastic coated adhesive sheet to the releasably adherable surface of the cutting platform with the metal foil image sheet in the shape of the metal foil heating circuit followed by removing the first plastic coated adhesive sheet in contact with to the releasably adherable surface of the cutting platform with the metal foil image sheet in the shape of the metal foil heating circuit from the releasably adhering surface of the cutting platform before the thermoset adhesive of the first adhesive layer cools enough to bond to the releasably adherable surface when the adhesive surface of the first adhesive layer of the first plastic coated adhesive sheet is tacky, and
wherein adhering the second plastic coated adhesive sheet to the first plastic coated adhesive sheet with the metal foil image sheet in the shape of the metal foil heating circuit is done by applying pressure and heat sufficient to melt the thermoset adhesive of the first adhesive layer and the second adhesive layer to a tacky state sufficient to adhere to each other, and remaining at that pressure and a temperature for enough time to cure the thermoset adhesive of the second adhesive layer and form a permanent bond.

20. The method of claim 19 wherein the thermoset adhesives of the first adhesive layer and the second adhesive layer is a curable adhesive that is 100% solid at 30° C., softens to a tacky phase in temperature ranges of 80-300° C., and cures when exposed to temperatures above for a time of at least 15 minutes to solidity at temperatures up to 300° C. before decomposing.

21. The method of claim 19 wherein the thermoset adhesives of the first adhesive layer and the second adhesive layer is from a group consisting of a natural or synthetic rubber, an acrylic polymer, a silicone, and a nitrile rubber and a phenolic resin combination.

* * * * *